United States Patent Office 3,799,906
Patented Mar. 26, 1974

3,799,906
HEAT STABILITY OF ASBESTOS-FILLED POLYPROPYLENE
John H. Kietzman, Middlesex, and Mario P. Tocci, Somerville, N.J., assignors to Johns-Manville Corporation, New York, N.Y.
No Drawing. Filed Nov. 10, 1971, Ser. No. 197,508
Int. Cl. C08f 45/10
U.S. Cl. 260—42.45  10 Claims

ABSTRACT OF THE DISCLOSURE

Polyester forming reactants of low volatility including an organic acid or anhydride such as trimellitic anhydride, and a polyhydric alcohol, such as dipentaerythritol or pentaerythritol, are admixed at a temperature above 400° F. with partially stabilized polypropylene and asbestos filler to provide a heat stabilized, asbestos-filled polypropylene composition.

BACKGROUND OF THE INVENTION

This invention relates to a method and a composition for inhibiting the heat degradation of polypropylene polymers filled with asbestos reinforcing fibers. More particularly, the invention relates to stabilized filler formulations, a method of incorporating asbestos fiber and stabilizer during plastication of polypropylene, and to polypropylene products possessing desirable physical characteristics.

Asbestos fibers possess many desirable properties for use as a reinforcing filler for polypropylene. They improve the hardness, stiffness, and heat deflection of polypropylene compositions in which they are incorporated. However, asbestos fibers when used as reinforcing fillers for polypropylene possess one major disadvantage—the promotion of polymer instability at elevated temperatures.

Polypropylene is commonly exposed to elevated temperatures in making useful compositions and articles out of the resin form, and also in normal uses of some of these compositions and articles. Such customary processing procedures as roll compounding, injection molding, extrusion and the like involve elevated temperatures. In such end uses as electrical insulation, protective coatings for electrical wire, and plastic pipes for hot water and steam, elevated temperatures are frequently and normally encountered.

Despite the fact that asbestos fibers tend to accelerate polymer degradation at elevated temperatures, asbestos fibers are widely used in polypropylene as a reinforcing filler. The polypropylene heat degradation probelm has been ameliorated in the past by utilizing as fillers varieties of amphibole asbestos such as anthophyllite, in conjunction with chemical stabilizer systems.

While the cost of chrysotile asbestos is only 40 to 50 percent of the cost of anthophyllite, chrysotile's greater exposed surface area and potential for chemical reactivity have generally required economically prohibitive amounts of chemical stabilizers to achieve heat-degradation properties that even approach the properties of anthophyllite-filled polypropylene. In other words, to achieve the same heat stability properties, the cost of the stabilizers needed for use with chrysotile have generally exceeded the sum of the cost of the stabilizers needed for use with anthophyllite and the cost differential between the anthophyllite and chrysotile. Thus, there has existed a need for improved stabilizer compositions, and for methods of inhibiting the heat degradation of asbestos-filled polypropylene.

SUMMARY OF THE INVENTION

The invention provides an improved heat stabilized, asbestos-reinforced polypropylene composition comprising asbestos fiber, polypropylene, and the product of compounding polyester forming reactants having a melting point of form 250–550° F. including 1 to 2 parts by weight of an organic acid or anhydride and 1 to 2 parts of a polyhydric alcohol, such as dipentaerythritol or pentaerythritol in the presence of the polypropylene at a temperature above 400° F.

The invention also provides a process of producing a fiber reinforced, heat-stabilized polypropylene article comprising admixing at a temperature above 400° F. a mixture comprising 1 to 2% by weight of an organic acid or anhydride; 1 to 2% by weight of a polyhydric alcohol such as pentaerythritol or dipentaerythritol; dry asbestos fiber; and polypropylene resin; and molding the admixture to produce a heat stabilized polypropylene article.

The invention further provides a filler composition that is capable of improving the strength properties of molded polypropylene articles without deleteriously affecting the heat degradation properties of the article. The filler composition comprises 1 to 2 parts by weight of trimellitic anhydride; 1 to 2 parts by weight of pentaerythritol or dipentaerythritol; and 35 to 40 parts by weight of chrysotile asbestos fiber. For optimum properties, the filler composition also includes 1 to 2 parts by weight in the aggregate of conventional peroxide decomposition stabilizers such as dilauryl or distearyl thiodipropionyl phosphites, or metal complexes, and free radical scavengers such as ditert.-butyl-p-cresol and other hindered phenols.

The invention improves the thermal degradation properties of asbestos-filled polypropylene and permits the economical substitution of chrysotile asbestos fibers for anthophyllite fibers as reinforcing fillers for polypropylene. At comparable cost levels, the stabilizing method of the invention can be utilized with chrysotile asbestos to provide almost double the oven life of polypropylene-containing a comparable amount of anthophyllite, and a commercial stabilizer. Alternatively, if less of the stabilizer ingredients are utilized in the method of the invention, then a comparable oven test life can be achieved at a lower cost than is possible using anthophyllite and a commercial stabilizer.

The invention also permits dramatically increasing the oven life of anthophyllite-filled polypropylene.

In another embodiment, the invention provides a method of producing a fiber reinforced, heat-stabilized polypropylene article comprising (a) admixing at a temperature above about 400° F. a mixture comprising about 0.5–5 parts by weight of a stabilizing agent such as pentaerythritol, dipentaerythritol and tripentaerythritol and carbohydrates such as maltol, which reacts with metallic hydroxides such as $Mg(OH)_2$ on the surface of asbestos fiber; dry asbestos fiber; and polypropylene resin to neutralize the chemical reactivity of the metal hydroxide sites on the asbestos fiber; and (b) molding the admixture to produce a heat-stabilized polypropylene article.

The pentaerythritols when added to polypropylene and asbestos as dry ingredients and compounded therewith are at least as effective in their heat-stabilizing effects, and much less expensive, when compared to the best known heat stabilizing techniques which involve surface treating the fibers, such as treatment with isocyanates or $SiF_4$ gas. The ability to achieve this degree of heat stabilization starting with a relatively inexpensive dry ingredient is surprising and unexpected.

The invention resides in the novel processes, compositions, and improvements shown and described. Both the foregoing general description and the following detailed description are exemplary and explanatory, and should not be considered to restrict the scope of the invention.

DETAILED DESCRIPTION OF PREFERRED EMBODIMENTS

In accordance with the process of the present invention, an organic acid or anhydride, such as trimellitic anhydride, and a polyhydric alcohol, such as dipentaerythritol, are admixed with asbestos fiber and polypropylene resin at a temperature above 400° F. While the exact reason that the present invention provides outstanding stabilizing results has not been proven, it is believed that the acid or acid anhydride and the polyhydric alcohol react to form a polyester, a reaction which may decompose the peroxide radicals which normally form on the polymer chain to initiate the polypropylene degradation reaction.

The invention effectively and efficiently stabilizes asbestos-filled propylene polymers, that is, homopolymeric polypropylene and copolymers of propylene and another 2 to 8 carbon olefin. Good stabilizing results are obtained on propylene copolymers which contain at least about 80% by weight polymerized propylene in the copolymer. Both the so-called "low density" and "high density" or high crystallinity polypropylene compositions can be stabilized in accordance with the invention.

The invention is suitable for stabilizing solid resinous, asbestos-filled polypropylene compositions in which the polypropylene has an average molecular weight of 15,000 and more, usually at least 20,000, and is readily usable with commercial grades of polypropylene including so-called prestabilized resin. Such polypropylene resins usually have a density of from 0.86 to 0.91 and a melting point above 150° C.

It is desirable to dry the asbestos fiber at temperatures of at least 350° F. prior to mixing the fibers with the other components of the mixture. It is believed that any water present on the asbestos fibers is liberated through steam distillation when the fiber, polypropylene and stabilizer constituents are admixed at elevated temperatures. Steam distillation tends to extract any stabilizer, such as a dilauryl thiodipropionyl phosphite, which is susceptible to extraction by water, and is therefore undesirable.

The beneficial effects of the invention are achieved when using either amphibole or chrysotile asbestos. However, because of chrysotile's lower cost, from an economic standpoint the invention is most advantageously practiced when chrysotile is used as the reinforcing filler.

It is desirable in producing a fiber reinforced, heat-stabilized polypropylene article in accordance with the invention to dry mix the organic acid or anhydride and the polyhydric alcohol with the polypropylene before admixing with the asbestos fiber. In addition, significantly improved stabilization results are achieved if the acid or acid anhydride, polyhydric alcohol, and polypropylene are prefluxed before addition of the asbestos fiber; i.e., admixed at a temperature above about 400° F.

In an alternate procedure, trimellitic anhydride and pentaerythritol (or substitutes) which are soluble in water above 90° C. may be dissolved in distilled water at 90 to 100° C. and applied by spray or immersion to the fiber surfaces as a coating, and then air dried at 100° C. before dry mixing with the polypropylene and a standard stabilizer system. Or the organic acid or anhydride and the polyols in powder form may be dry mixed with the fiber and stored at normal temperatures indefinitely before mixing with the polypropylene. When applied as a fiber coating or dry mixed with the fiber, the combination of trimellitic anhydride and dipentaerythritol are as effective in providing heat stability to filled polypropylene as when dry mixed with the polypropylene powder, fiber, and standard stabilizers before admixing above 400° F.

The preferred organic acids and anhydrides such as trimellitic anhydride and the preferred polyhydric alcohols, pentaerythritol or dipentaerythritol, should have relatively low vapor pressures at polypropylene working temperatures, that is, 450° to 500° F., so that they are not lost from the mix during hot-working, and a melting point of from 250° F. to 550° F. Other polyester-forming reactants which can be used include organic acids or anhydrides such as o-phthalic, and derivatives of terephthalic acids having the requisite melting point and volatility characteristics; and hexahydric alcohols such as the higher melting point forms of mannitol and sorbitol and their derivatives.

The preferred polyhydric alcohols are believed to react in situ with alkali metal hydroxides such as the $Mg(OH)_2$ which is the surface layer of chrysotile fiber. The effect of this reaction is to neutralize the chemical effect the $Mg(OH)_2$ surface has on the polypropylene degradation reaction during and after compounding (plastication) and molding. The pentaerythritol used as an admixture with standard stabilizer systems, but without the organic acid, provides a substantial improvement in heat stability which is equivalent in effect to other effective methods of fiber treatments or coatings used for the same purpose; this heat stability is equivalent to about 65% of that shown by the standard anthophyllite (uncoated) filled polypropylene.

The outstanding improvement in heat stability obtained by using both dipentaerythritol and trimellitic anhydride or suitable substitutes with chrysotile is believed to be the combined effect of the dipentaerythritol reaction with the fiber surface as described above and the slow polyester forming reaction of the two additives.

Thus, as described above, it is desirable to preflux the stabilizers with polypropylene for about one minute before adding asbestos fiber because this facilitates melting and dispersing of the stabilizers and special additives with the polyolefin before addition of chrysotile, thus giving maximum initial benefit. The stabilizing ingredients are compatible with the resin at all temperatures to which the composition is to be subjected.

The stabilizers of this invention can be used in conjunction with other common polypropylene stabilizers, without disadvantageous effect upon the stabilizing action of the other stabilizers. It is desirable and usually necessary in order to obtain the maximum benefits of the invention to incorporate other stabilizers into the polypropylene composition, especially those added as free radical inhibitors, i.e. hindered phenols or organic phosphites. Other stabilizers which act as peroxide decomposers such as thioesters may be of less importance when used with the stabilizers of this invention. Relatively low levels of these conventional stabilizers, 0.5 to 2 parts by weight per 10 to 40 parts by weight of asbestos fiber, are usually incorporated into the polypropylene composition.

Preferably, the prefluxed or premixed stabilizer system and polypropylene resin are admixed with asbestos fiber in suitable mixing equipment, such as a mill, a Banbury mixer, or an extruder. Mixing is continued until the ingredients of the admixture are substantially uniform, and a temperature of at least 400° F. and preferably 450–550° F. has been reached. The stabilized, fiber-reinforced polypropylene can then be molded into the desired shape by any convenient technique. The asbestos-reinforced, stabilized polypropylene possesses good resistance to discoloration and embrittlement on aging and heating.

A sufficient amount of the polyester-forming reactants, for example, trimellitic anhydride and pentaerythritol or dipentaerythritol, with additional stabilizers, is used to improve the stability against heat deterioration under the conditions to which the polypropylene composition will be subjetced. Small economically competitive amounts are usually adequate. Amounts within the range from about 1 to about 2 parts of each of trimellitic anhydride and dipentaerythritol or pentaerythritol per 35 to 40 parts of asbestos fiber impart satisfactory heat resistance. Preferably, stoichiometrically equivalent amounts of acid or acid anhydride and polyhydric alcohol are used, unless the filled polypropylene product is exposed to hydrolysis at high temperatures. Water extraction tests on asbestos-filled polypropylene suggest that the polyester forming reaction reverses itself by hydrolysis at elevated temperatures. As a result oven stability is greatly reduced especially with chrysotile. A change in the stoichiometric proportions of acid and polyol to give a surplus of the organic acid would be expected to inhibit the reverse reaction and maintain oven life after water extraction. This is primarily important only for filed polypropylene product exposed to high temperature water (washing machine parts, etc.).

The amount of asbestos filler incorporated is usually from 10 to 40 parts per 100 parts of filled polypropylene. When additional stabilizers are employed to obtain additional stabilization effects, the amount of total stabilizer is preferably within the range from about 0.5 to about 2.0% by weight of the total composition including polypropylene and asbestos fiber.

As a convenience for manufacturers of asbestos-filled polypropylene products, the invention provides a filler composition comprising 1 to 2 parts by weight of trimellitic anhydride; 1 to 2 parts by weight of polyhydric alcohol selected from the group consisting of pentaerythritol, dipentaerythritol, and mixtures thereof, and 35 to 40 parts by weight of chrysotile asbestos fiber. This filler composition can be directly incorporated in the polymer in suitable mixing equipment such as a mill, Banbury mixer, or plastication rolls. The direct incorporation of such a filler composition into polypropylene permits achieving good heat resistance and is very convenient. However, it should be noted that prefluxing the stabilizers with the resin before addition of the asbestos filler produces an oven test life that usually exceeds that obtained by simply fluxing a filler composition, as above described, with polypropylene resin.

For a better understanding of the invention, the following examples are provided. These examples are intended to be illustrative and should not be construed as limiting the invention. All parts and percentages listed in the specification and claims are by weight unless otherwise noted.

EXAMPLES 1–4

A series of heat-stabilized, asbestos-filled polypropylene compositions are prepared in accordance with the invention. Each composition is formed by compounding dry mixtures of a commercially available polypropylene resin, chrysotile asbestos group 7 fibers, and stabilizing ingredients at 450° F. for about 3 to 5 minutes.

Each of the compositions includes trimellitic anhydride and a polyhydric alcohol, 40 parts by weight of chrysotile asbestos fibers sold by Johns-Manville Corporation under the grade designation shown in Table I below, and 1.8 parts of a standard, four-component stabilizer mixture used in anthophyllite-filled polypropylene. Sufficient polypropylene is provided to bring the total weight of each composition to 100 parts.

The compounded mixture is compression molded into ⅛ inch thick sheets. The molded sheets are then tested to determine their oven life at 310° F., that is the time in hours until 10% degradation occurs. Table I below shows the oven life at 310° F. of the compositions of Examples 1–4.

TABLE I

| Example number | Asbestos (grade designation) | Chemical stabilizers (parts by weight) | Oven life at 310° F. (hours to 10% degradation) |
| --- | --- | --- | --- |
| 1 | 7R | Trimellitic anhydride (2) / Dipentaerythritol (2) | 1,930 |
| 2 | 7R | Trimellitic anhydride (1.5) / Dipentaerythritol (1.5) | 1,800 |
| 3 | 7M | Trimellitic anhydride (2) / Dipentaerythritol (2) | 1,930 |
| 4 | 7R | Trimellitic anhydride (2) / Pentaerythritol (2) | 1,310 |
| Anthophyllite control. | | | 900 |

A control test is run in which 40 parts of a commercially available anthophyllite asbestos fiber (Aplex 101 sold by Asbestos Corporation of America) is incorporated in 58.2 parts of polypropylene resin and 1.8 parts of the standard commercially utilized, four-component stabilizer system. No trimellitic anhydride or polyhydric alcohol was added. The oven life of this control composition is also shown in Table I. The compositions of Examples 1–4 all exhibit a significantly increased oven life at 310° F. compared to the control composition. Significantly, the compositions of Examples 1–4 can be formulated at less cost than the control composition containing anthophyllite.

The beneficial stabilizing effects of this invention are much greater when the acid or acid anhydride and a polyhydric alcohol are each present in unreacted form prior to being admixed with the polypropylene than when the anhydride and alcohol are prereacted before admixture.

Trimellitic anhydride and polyhydric alcohols (polyols) are known to combine by condensation reaction at elevated temperatures to form a polyester. Final cure of the polyester to a thermoset condition takes place very slowly by free radical polymerization (between polyester chains) which requires breakdown of an organic peroxide catalyst. In the asbestos-filled polypropylene composition of this invention, the unwanted peroxides (which form on the polypropylene chains and initiate degradation) are believed to be decomposed by the slow polymerization of the polyester formed by the organic acids and polyols described in this invention.

Because trimellitic anhydride and polyhydric alcohol are known to combine by condensation reaction at elevated temperatures to form a polyester, the possibility that a polyester per se might be an effective stabilizing agent was tested by the following procedure. Chrysotile fiber sold by Johns-Manville Corporation under the grade designation 7R was coated with a commercial grade of a liquid polyester diluted by 50% styrene monomer (Altek 8-JM sold by Alpha Chemical) without using the usual peroxide catalyst by vacuum impregnation. When compounded and molded with polypropylene in accordance with the procedure described above for Examples 1–4, the resulting composition provides an oven stability of only 600 hours, equivalent to other fiber treatments which neutralize the chemical reactivity of the asbestos fiber surfaces (including dehydroxylation at elevated temperatures, reactions with $SiF_4$ gas or isocyanates at normal temperatures). When the peroxide catalyst was added to the polyester before being applied as a fiber coating, the end result was a 50% decrease in oven life of the molded sheet at 310° F. Adding the peroxide catalyst to the polyester apparently inhibited its ability to decompose peroxides which form on the polypropylene chain. These results support the theory that the outstanding effectiveness of the trimellitic anhydride-polyhydric alcohol mixture in stabilizing asbestos-filled polypropylene results from a polymerization reaction of these stabilizers that decomposes peroxide radicals which normally form on the polymer chain and initiate the polypropylene degradation reaction.

The molded sheets produced in accordance with Examples 1–4 and the anthophyllite control sheet are subjected to flexural strength tests and heat deflection tests with the results shown in Table II below:

TABLE II

| Example | Flexural Modulus, p.s.i. ×10⁵ | Ultimate strength, p.s.i. | Heat deflection, °F. |
|---|---|---|---|
| Anthophyllite control | 5.50 | 7,280 | 182 |
| 1 | 4.72 | 7,900 | 239 |
| 2 | 5.10 | 8,350 | 234 |
| 3 | 5.31 | 8,330 | 226 |
| 4 | 6.71 | 8,860 | 205 |

The results of the flexural tests and the heat deflection test show that the stabilized asbestos composition of this invention possess physical properties that are comparable to or exceed the properties exhibited by an anthophyllite-containing composition containing a conventional commercial stabilizer.

EXAMPLE 5

A stabilized, anthophyllite-filled polypropylene sheet is formulated in accordance with the procedure outlined for the anthophyllite control in Examples 1–4 and containing 2% trimellitic anhydride and 2% dipentaerythritol in place of a like weight percent of polypropylene. This sheet shows a 10% degradation at 1760 hours, at 310° F., an improvement of over 800 hours in oven life.

EXAMPLE 6

An asbestos-filled polypropylene composition is formed by compounding 56 parts of polypropylene resin, 40 parts of chrysotile asbestos fiber, 2 parts of trimellitic anhydride, and 2 parts of dipentaerythritol at 450° F. for about 3 to 5 minutes. The compounded admixture is then compression molded into ⅛ inch thick sheets. When tested for oven life at 310° F., the composition of Example 6 exhibits significantly improved oven life over a composition containing only chrysotile asbestos fiber and polypropylene.

EXAMPLE 7

An anthophyllite-filled polypropylene sheet is formulated in accordance with the procedure outlined for the anthophyllite control of Examples 1–4 with the addition of 2% tripentaerythritol and 2% fumaric acid which replaces trimellitic anhydride in the formulation. The resulting composition exhibits an oven test life of 1656 hours at 310° F. an improvement of better than 700 hours when compared to the oven life of the control.

The foregoing detailed description has been provided for clearness of understanding only and no unnecessary limitations should be implied therefrom. Some modifications of the process and product described may be readily apparent to those skilled in the art.

What is claimed is:

1. A process of producing an asbestos reinforced, heat-stabilized polypropylene article comprising:
  (a) admixing at a temperature above about 400° F. a mixture comprising, in parts by weight per 100 parts by weight of polypropylene, 1 to 2 parts of polyester forming organic acid or acid anhydride having a melting point of 250–550° F.; 1 to 2 parts of a polyhydric alcohol having a melting point of from 250–550° F.; 10 to 40 parts of asbestos fiber; and polypropylene resin; and
  (b) molding the admixture to produce a heat-stabilized article.

2. The process of claim 1 including the step of prefluxing at a temperature above 400° F. the ingredients of said mixture other than said asbestos fiber before the admixing step.

3. The process of claim 2 in which the asbestos fiber is chrysotile and including the step of drying the chrysotile asbestos fiber at a temperature above about 350° F. before the prefluxing step to remove moisture from the fiber which would otherwise distill from the mixture.

4. The process of claim 1 in which the organic acid or anhydride is trimellitic anhydride and the polyhydric alcohol is dipentaerythritol.

5. The process of claim 4 in which said mixture includes about two parts by weight of trimellitic anhydride, two parts by weight dipentaerythritol and 35 to 40 parts by weight of asbestos fiber.

6. The process of claim 1 in which 0.5–2.0 parts by weight of a free radical inhibitor selected from the group consisting of hindered phenols and organic phosphites is admixed with the asbestos fiber and polypropylene resin.

7. A heat-stabilized filler-reinforced polypropylene composition comprising, in parts by weight per 100 parts by weight of polypropylene, 35 to 40 parts of asbestos fiber, polypropylene, and the product of compounding 1 to 2 parts of an organic acid or anhydride and 1 to 2 parts of a polyhydric alcohol, the organic acid or anhydride and the polyhydric alcohol having a melting point of from 250–550° F., in the presence of the asbestos fiber and polypropylene at a temperature above about 400° F.

8. The composition of claim 7 in which approximately equal parts by weight of trimellitic anhydride and the polyhydric alcohol are present.

9. The composition of claim 8 in which the polyhydric alcohol is dipentaerythritol.

10. The composition of claim 8 in which asbestos is chrysotile asbestos.

References Cited

UNITED STATES PATENTS

| | | | |
|---|---|---|---|
| 3,553,158 | 1/1971 | Gilfillan | 260—41 |
| 3,649,592 | 3/1972 | Bernard et al. | 260—41 |
| 3,180,848 | 4/1965 | Thompson | 260—41 |
| 3,640,929 | 2/1972 | Darling | 260—23 |
| 3,219,622 | 11/1965 | Luciani et al. | 260—45.85 T |

FOREIGN PATENTS 1,219,783  1/1971  Great Britain  260—41

OTHER REFERENCES

French printed application, 2,004,246, Imperical Chemical Industries Limited, Nov. 21, 1969.

MORRIS LIEBMAN, Primary Examiner

J. H. DERRINGTON, Assistant Examiner

U.S. Cl. X.R.

260—42.14, 45.85 T, 873